United States Patent
Fujisawa (10) Patent No.: US 7,194,739 B2
(45) Date of Patent: Mar. 20, 2007

(54) MULTI-APPLICATION EXECUTION SYSTEM AND METHOD THEREOF

(75) Inventor: Kunimasa Fujisawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 672 days.

(21) Appl. No.: 10/320,129

(22) Filed: Dec. 16, 2002

(65) Prior Publication Data

US 2003/0115245 A1 Jun. 19, 2003

(30) Foreign Application Priority Data

Dec. 17, 2001 (JP) ............................. 2001-382999

(51) Int. Cl.
*G06F 9/44* (2006.01)
*G06F 9/48* (2006.01)
*G06F 9/54* (2006.01)
*G06F 7/04* (2006.01)
*H04L 9/32* (2006.01)

(52) U.S. Cl. .................... 718/100; 719/313; 726/2; 713/167

(58) Field of Classification Search ............... 718/1, 718/100–108; 719/310–332; 726/2; 713/167
See application file for complete search history.

(56) References Cited

U.S. PATENT DOCUMENTS

| | | | |
|---|---|---|---|
| 5,297,283 A | | 3/1994 | Kelly, Jr. et al. |
| 6,542,920 B1 * | | 4/2003 | Belkin et al. ............... 718/104 |
| 6,604,125 B1 * | | 8/2003 | Belkin ......................... 718/104 |
| 6,748,453 B2 * | | 6/2004 | Law et al. ................... 719/314 |
| 6,782,537 B1 * | | 8/2004 | Blackmore et al. ......... 719/313 |
| 6,931,544 B1 * | | 8/2005 | Kienhofer et al. .......... 717/118 |

FOREIGN PATENT DOCUMENTS

EP 0549208 6/1993
EP 0686915 12/1995

OTHER PUBLICATIONS

Balfanz, Dirk et al. "Experience with Secure Multi-Processing in Java." Sep. 29, 1997.*
Hawblitzel, Chris et al. "Implementing Multiple Protection Domains in Java." USENIX Annual Technical Conference, New Orleans, LA, Jun. 1998.*
Back, Godmar et al. "Processes In KaffeOS: Isolation, Resource Management, and Sharing in Java." Department of Computer Science, University of Utah. Technical Report UUCS-00-010. Apr. 2000.*

* cited by examiner

*Primary Examiner*—Lewis A. Bullock, Jr.
(74) *Attorney, Agent, or Firm*—Morgan & Finnegan, L.L.P.

(57) ABSTRACT

In a single-process/multithread environment, a thread group is prepared for every application, the application is started on the thread belonging to this thread group. When a certain thread accesses a different thread, this access is trapped and rejected if these threads do not belong to the same application thread group. This scheme, when a plurality of applications is run on different threads, prevents parameters etc. within the application from being changed by other applications.

5 Claims, 8 Drawing Sheets

| THREAD GROUP NAME | APPLICATION NAME |
|---|---|
| THREAD GROUP 01 | APPLICATION 01 |
| ⋮ | ⋮ |

| APPLICATION NAME | SYSTEM RESOURCE |
|---|---|
| APPLICATION 01 | SYSTEM RESOURCE 01, SYSTEM RESOURCE 02 |
| APPLICATION 02 | SYSTEM RESOURCE 02 |
| ⋮ | ⋮ |

MULTI-APPLICATION EXECUTION SYSTEM AND METHOD THEREOF

BACKGROUND OF THE INVENTION

1. Field of the Invention

The present invention relates to a multi-application execution system and to a storage medium.

2. Related Background Art

Figure 9:
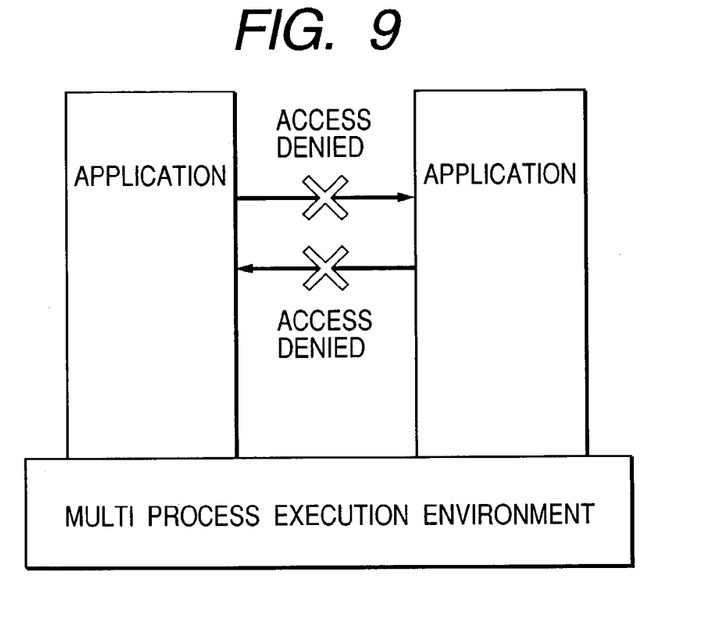
FIG. 9 is a diagram showing a multi-process execution environment.
Figure 10:
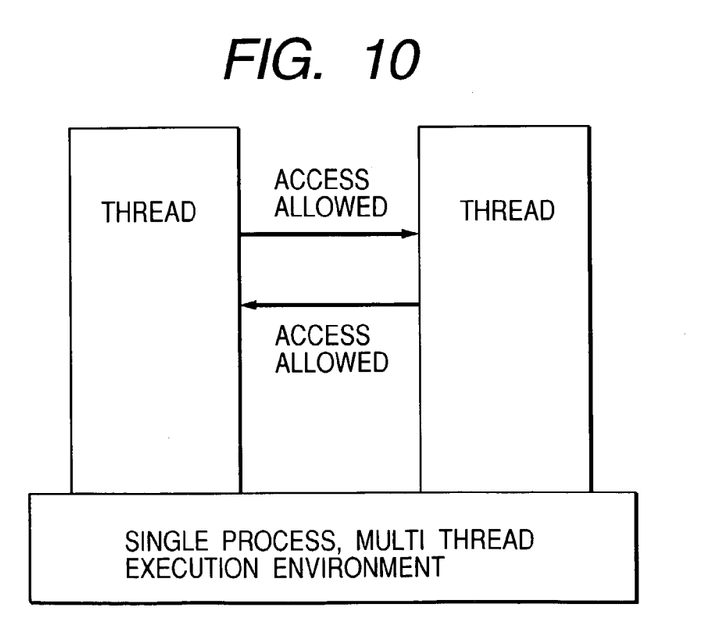
FIG. 10 is a diagram showing a single-process/multi-thread execution environment.

As shown in FIG. 9, in a multi-process execution environment, a memory space of each process is safeguarded by the execution environment, and hence it does not happen that parameters etc. are accessed by a different process without permission. As illustrated in FIG. 10, however, in a single-process/multithread execution environment as on Java(™) platform, the thread is not given a protection of the memory space unlike the process.

Further, normally only one application runs on a single virtual machine of Java(™). Therefore, in the case of scheming to execute a plurality of applications on a certain device, it is required that a plurality of virtual machines be executed. A built-in device is, however, hard to execute the plurality of virtual machines in terms of resources of the device.

What has therefore hitherto been practiced is an execution of the application on one virtual machine in a way that allocates the thread to every application.

In this case, however, each application runs on the same process, and hence the data within the application and system resources are not sufficiently protected.

Further, a Java(™) security manager, when a certain thread accesses a different thread, merely provides only a control framework as to whether this access should be enabled or not but does not, if a plurality of applications run on one virtual machine, provide any scheme showing what condition and how the application-to-application data and the system resources be protected and the access be enabled under.

SUMMARY OF THE INVENTION

Under such circumstances, it is an object of the present invention to provide a multi-application execution system capable of protecting application data and system resources in the case of running a plurality of applications on a single virtual machine, and a storage medium thereof.

According to one aspect, the present invention which achieves this objective relates to a multi-application execution system comprising starting means for starting each of the applications on a thread belonging to a thread group allocated to this application, thread storage means for storing the threads in a mapping relationship with the thread groups, searching means for searching, when a certain thread tries to access a different thread in a program, thread groups to which these two threads belong, from the thread storage means, and access control means for enabling the access if the thread groups, obtained by the searching means, to which the two threads belong, are identical.

According to another aspect, the present invention which achieves the objective relates to a multi-application execution system comprising starting means for starting each of the applications on a thread belonging to a thread group allocated to this application, thread storage means for storing the threads in a mapping relationship with the thread groups, first searching means for searching, when a certain thread tries to access a system resource in a program, a thread group to which this thread belongs, from the thread storage means, thread group storage means for storing each application in a mapping relationship with the thread group allocated to this application, second searching means for searching the application mapping to the thread group obtained by the first searching means, from the thread group storage means, system resource name storage means for storing names of system resources available for the respective applications, judging means for judging whether an access target system resource is available for the application obtained by the second searching means with reference to the system resource name storage means, and access control means for rejecting the access if the judging means judges that the access target system resource is not available.

According to still another aspect, the present invention which achieves the objective relates to a multi-application execution method comprising the steps of starting each of applications on a thread belonging to a thread group allocated to this application, searching, when a certain thread tries to access a different thread in a program, thread groups to which these two threads belong, from thread storage means for storing threads in a mapping relationship with thread groups, and enabling the access if the thread groups, obtained in the searching step, to which the two threads belong, are identical.

According to yet another aspect, the present invention which achieves the objective relates to a multi-application execution system comprising the steps of starting each of the applications on a thread belonging to a thread group allocated to this application, searching, when a certain thread tries to access a system resource in a program, a thread group to which this thread belongs, from the thread storage means for storing the threads in a mapping relationship with the thread groups, searching the application mapping to the thread group obtained in the searching step, from the thread group storage means for storing each application in a mapping relationship with the thread group allocated to this application, and judging whether an access target system resource is available for the application obtained by searching with reference to system resource name storage means for storing names of system resources available for the respective applications, and rejecting the access if the access target system resource is judged not to be available in the judging step.

According to a further aspect, the present invention which achieves the objective relates to a computer-readable storage medium storing a program for controlling a computer to perform a plurality of applications, the program comprising codes for causing the computer to perform starting each of applications on a thread belonging to a thread group allocated to this application, searching, when a certain thread tries to access a different thread in a program, thread groups to which these two threads belong, from thread storage means for storing threads in a mapping relationship with thread groups, and enabling the access if the thread groups, obtained in the searching step, to which the two threads belong, are identical.

According to a still further aspect, the present invention which achieves the objective relates to a computer-readable storage medium storing a program for controlling a computer to perform a plurality of applications, the program comprising codes for causing the computer to perform starting each of the applications on a thread belonging to a thread group allocated to this application, searching, when a certain thread tries to access a system resource in a program, a thread group to which this thread belongs, from the thread storage means for storing the threads in a mapping relationship with the thread groups, searching the application mapping to the thread group obtained in the searching step, from the thread group storage means for storing each application in a mapping relationship with the thread group allocated to this application, and judging whether an access target system resource is available for the application obtained by searching with reference to system resource name storage means for storing names of system resources available for the respective applications, and rejecting the access if the access target system resource is judged not to be available in the judging step.

Other objectives and advantages besides those discussed above shall be apparent to those skilled in the art from the description of preferred embodiments of the invention that follow. In the description, reference is made to accompanying drawings, which form a part thereof, and which illustrate an example of the invention. Such example, however, is not exhaustive of the various embodiments of the invention, and therefore reference is made to the claims, which follow the description for determining the scope of the invention.

DESCRIPTION OF THE PREFERRED EMBODIMENTS

One preferred embodiment of the present invention will hereinafter be described in depth with reference to the accompanying drawings.

First Embodiment

Figure 1:
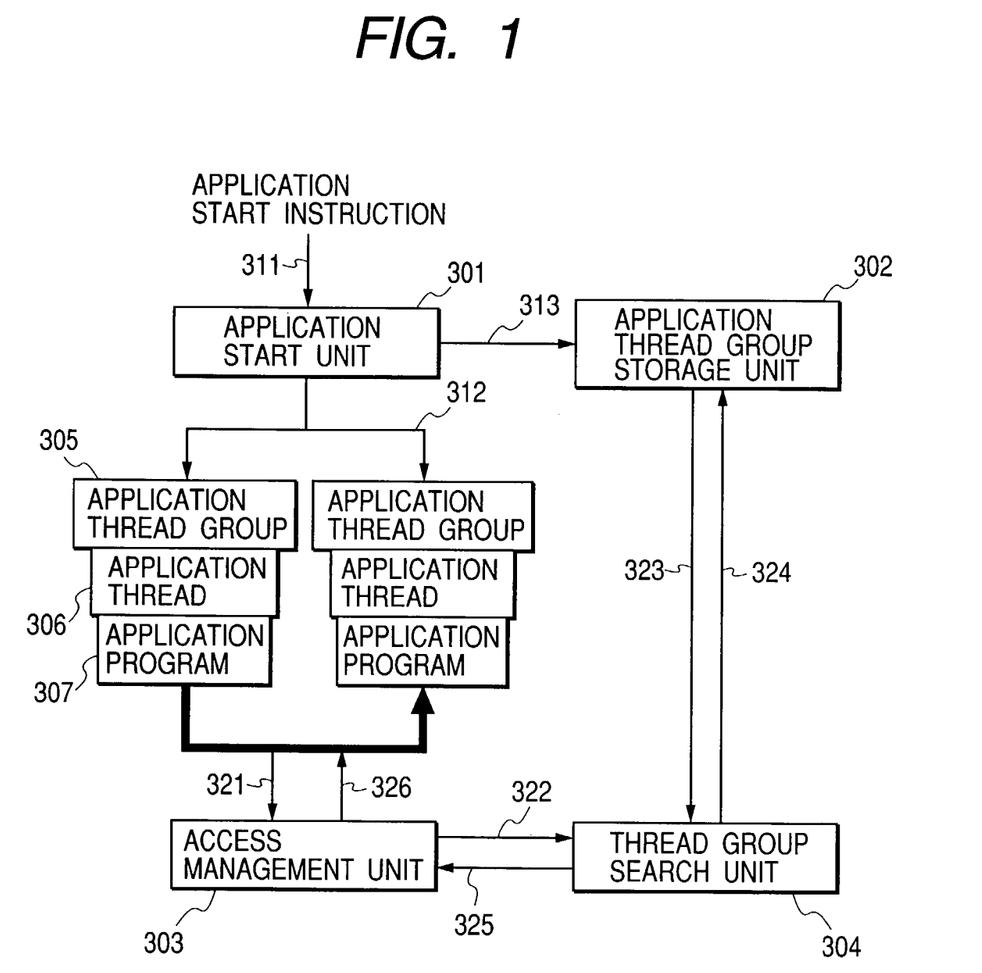
FIG. 1 is a diagram showing an outline of a system architecture.
Figure 2:
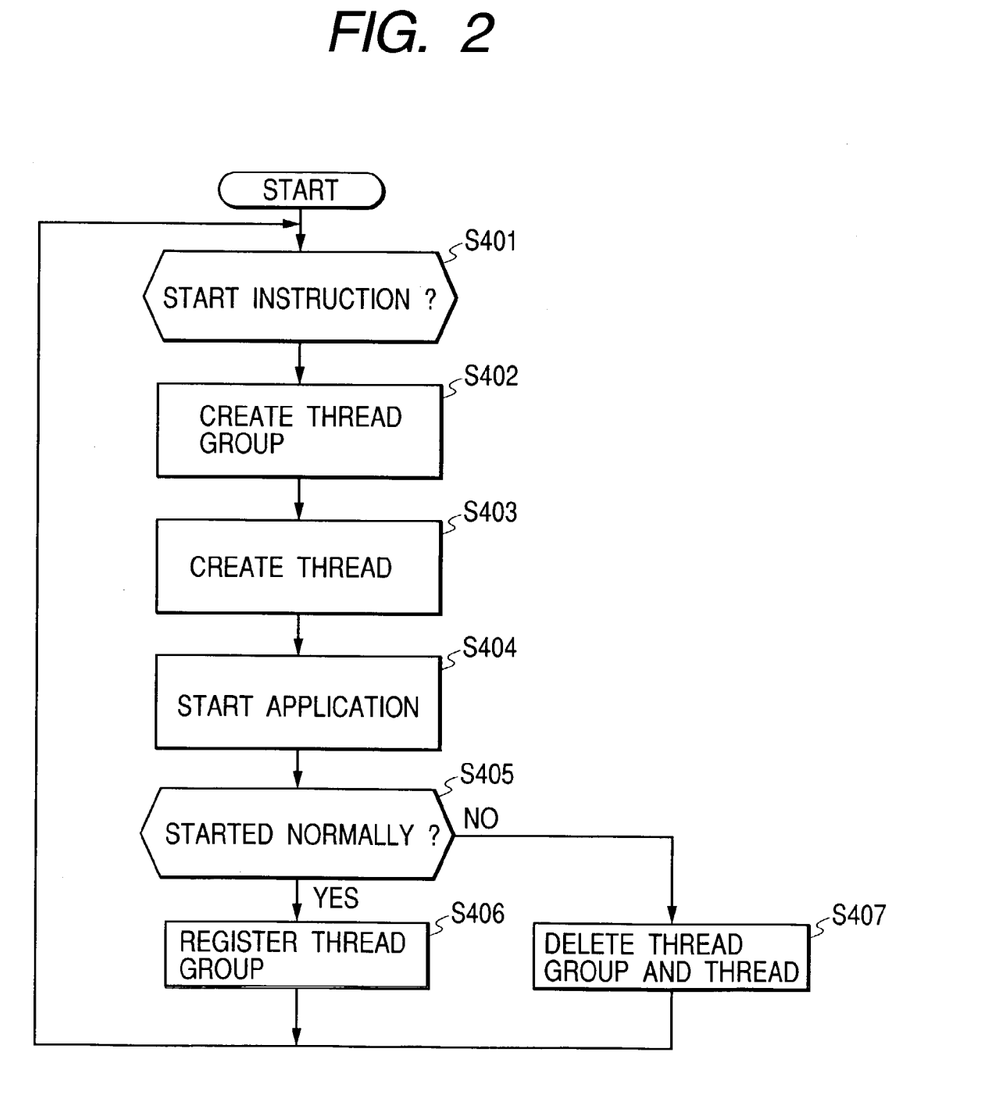
FIG. 2 is a flowchart showing steps of registering a thread group for an application.
Figure 5:
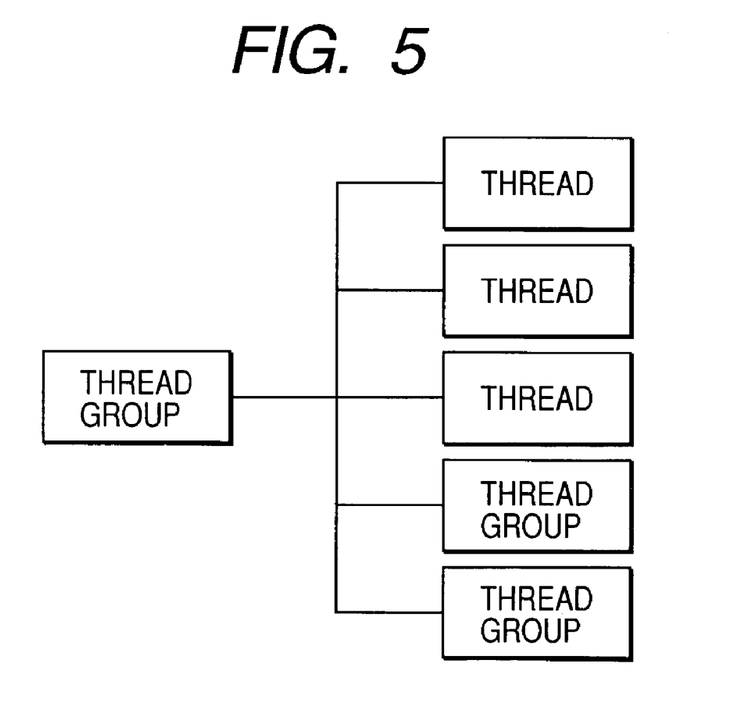
FIG. 5 is a diagram of a structure of the thread group.

FIG. 1 is a diagram showing an outline of a system. FIG. 2 is a flowchart showing steps of registering a thread group for an application. When an application start instruction 311 is given from a user in step S401, an application start unit 301 generates one thread group for the application in step S402. Herein, the thread group is defined, as shown in FIG. 5, as an aggregation of threads or thread groups.

The application thread group belonging to that thread group is further generated in step S403, and an application program given a start instruction in that thread, is booted in step S404. It is checked in step S405 whether the application is normally started or not.

If normally started, in step S406, the thus generated thread group is registered in a thread group storage unit 302 for the application, and an application start process is terminated, thereby coming to a standby status for a new start instruction. Whereas if the application is not normally started, in step S407, the generated thread group and thread are discarded, thereby coming to the standby status for an application start.

Figure 4:
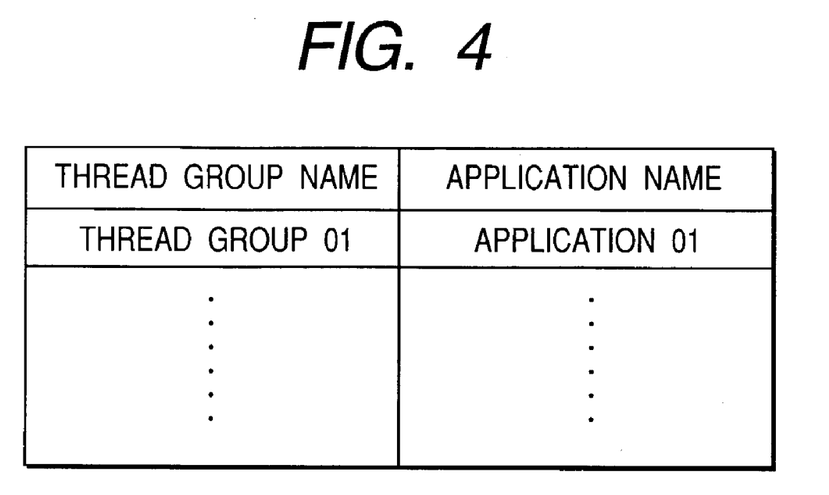
FIG. 4 is a diagram of a structure of a thread group storage unit for the application.

The application thread group storage unit 302 is, as shown in FIG. 4, implemented as a table containing a thread group name as a key and an application name as a value. Further, it is assumed that a relationship (FIG. 5) between the thread and the thread group be table-formatted and thus stored.

Figure 3:
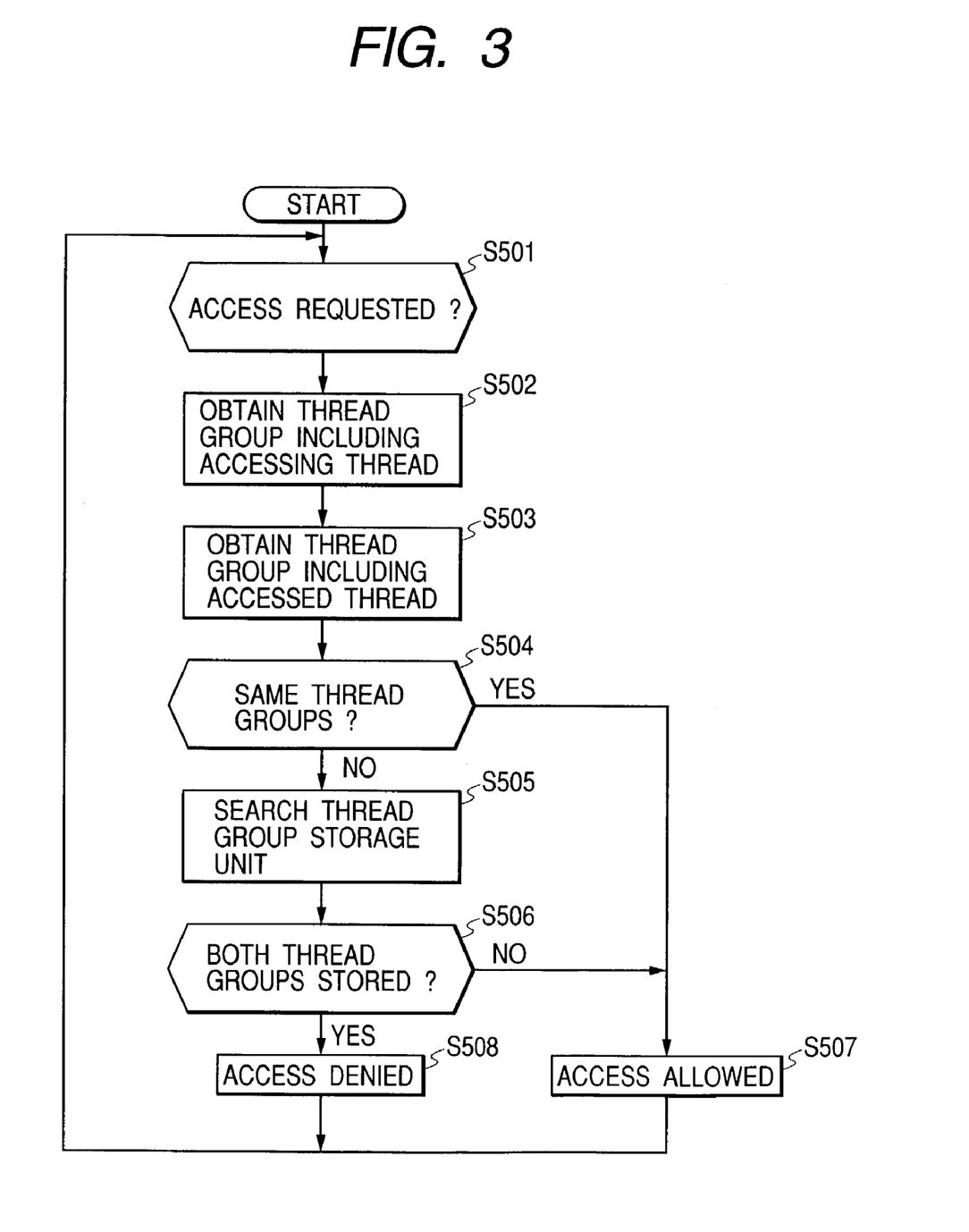
FIG. 3 is a flowchart showing steps of determining whether an access to a parameter is enabled or not.

FIG. 3 is a flowchart showing steps of determining whether a parameter is accessible or not. When a certain thread tries to access a parameter of a different thread (step S501), an access management unit 303 traps this accessing (321), and at first acquires from the table a thread group to which the thread trying to access the parameter belongs (step S502). Further, the access management unit 303 acquires from the table a thread group to which the thread having the accessing target parameter belongs (step S503).

It is checked in step S504 whether the two thread group obtained in steps S502 and S503 are identical with each other. If identical, the access is assumed to be a parameter access between the threads having no relation with the application or between the threads within the same application, and the access management unit 303 stops processing thereat. The accessing is thereby enabled (step S507), and next there is a wait for a certain thread to access a parameter of a different thread.

If the two thread groups are different from each other, a thread group search unit 304 is requested to search the application thread group storage unit 302.

The thread group search unit 304 examines through a list from its head whether the thread groups obtained in steps S502 and S503 exist in the application thread group storage unit 302 (step S505). It is checked whether both of the thread groups obtained in steps S502 and S503 are stored on the application thread group unit 302 (step S506). If neither of the threads is stored on the application thread group storage unit 302, or if only one thread is stored, the access management unit 303 stops processing thereat. The accessing is thereby enabled (step S507), and next there is a wait for a certain thread to access a parameter of a different thread.

If both of the threads are stored on the application thread group storage unit 302, the access is assumed to be a parameter access between the different applications, and an exception of an access rejection is made to occur, thereby inhibiting the parameter access from being done (step S508).

Second Embodiment

Figure 7:
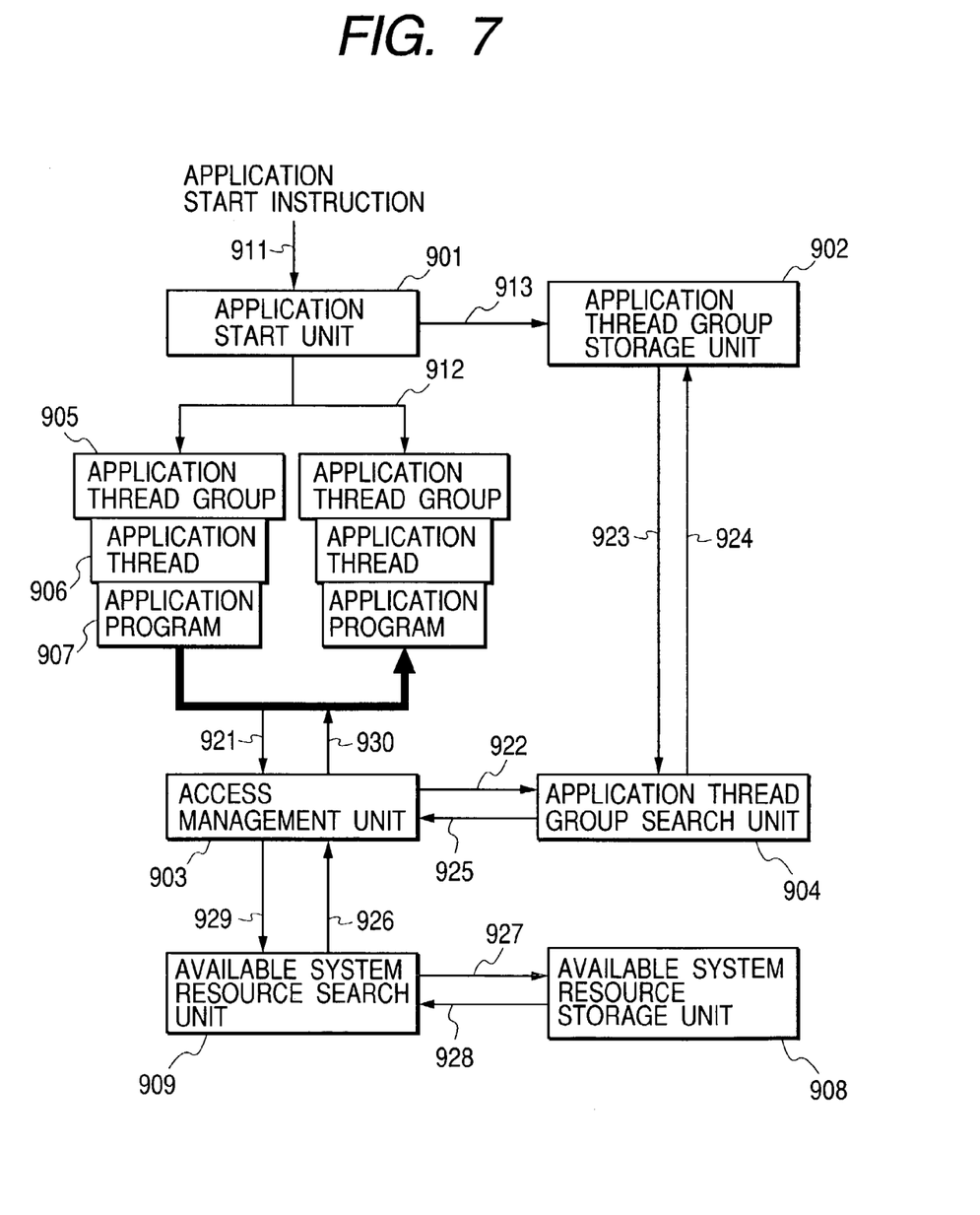
FIG. 7 is a diagram showing an outline of system architecture in an embodiment 2.
Figure 8:
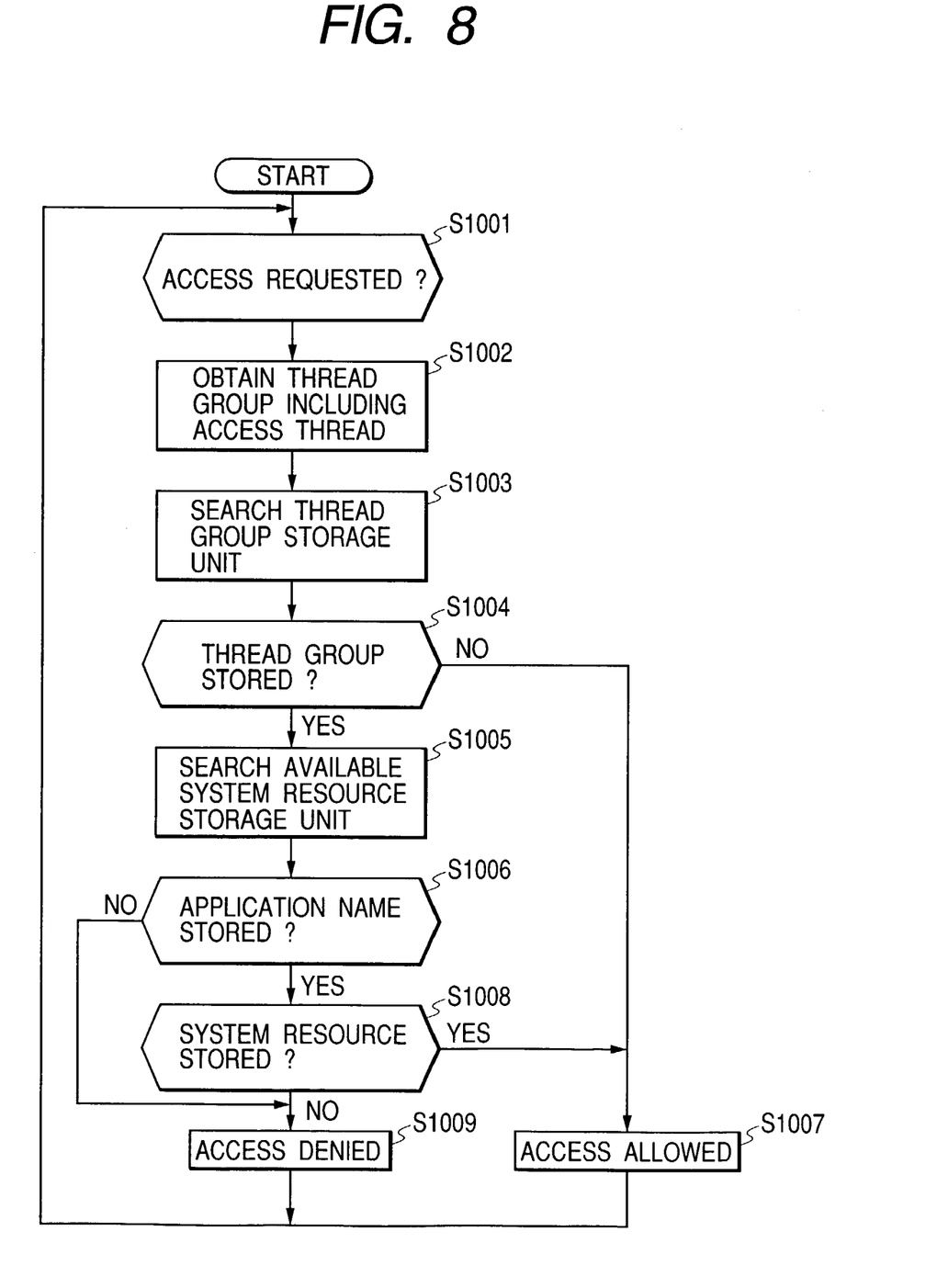
FIG. 8 is a flowchart showing steps of determining whether the system resource is available or not.

FIG. 7 is a diagram showing an outline of a system in a second embodiment. FIG. 8 is a flowchart showing steps of determining whether the system resources can be utilized or not.

The steps of starting the application through registering the thread group to which the thread on which to run the application belongs, are the same as those in the first embodiment.

Figure 6:
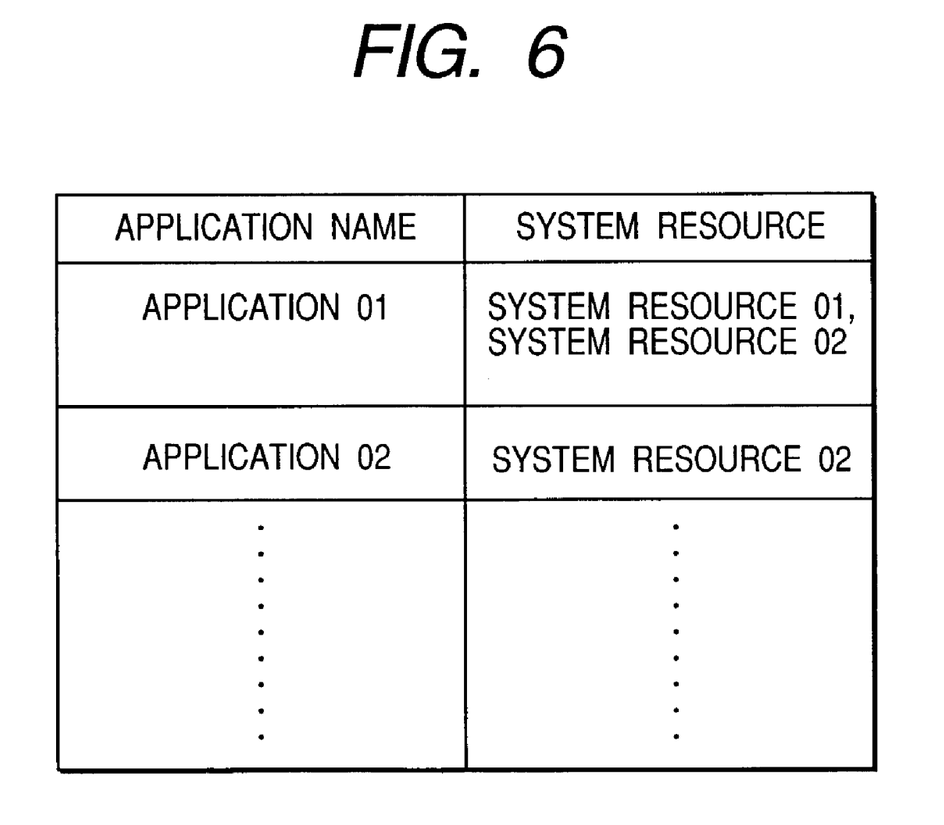
FIG. 6 is a diagram of a structure of a storage unit of system resources available for the application.

An application available system resource storage unit 908 is, as shown in FIG. 6, implemented as a table containing an application name as a key and an application available system resource as a value.

When a certain thread tries to use the system resources (step S1001), an access management unit 903 traps this action (921), and at first acquires a thread group to which the thread trying to use the. system resources (step S1002), and requests a thread group search unit 904 to search an application thread group storage unit 902 (922).

The thread group search unit 904 examines through a list of the application thread group storage unit 902 from its head whether the thread group acquired in step 1001 exists in the application thread group storage unit 902 (step S1003). Then, the thread group search unit 904 checks whether the thread group acquired in step S1002 is stored on the application thread group storage unit 902 (step S1004). If the thread group is not stored on the application thread group storage unit 902, the access management unit 903 stops processing thereat. The accessing is thereby enabled (step S1007), and next there is a wait for a certain thread to use the system resource.

Whereas if the thread group is stored on the application thread group storage unit 902, in step S1005, the available system resource search unit 909 searches for the application name obtained in step S1003 from a head of the available system resource storage unit 908. In step S1006, if the application name acquired in step S1003 does not exist in a "key" field of the table of the available system resource storage unit 908, it is assumed that this application has no authority of using the system resources, and there occurs an exception of a use rejection (step S1009).

In step S1006, if the application name acquired in step S1003 exists in the "key" field of the table of the available system resource storage unit 908, it is examined whether the try-to-use system resource is contained in values obtained by searching the available system resource storage unit 908, wherein the application name acquired in step S1002 is used as a key (step S1008). If contained, the access management unit 903 stops processing thereat. The accessing is thereby enabled (step S1007), and next there is a wait for a certain thread to use the system resource.

Whereas if the try-to-use system resource is not contained, it is assumed that the application concerned has not authority of using the system resource, and there occurs an exception of the user rejection (step S1009).

According to the embodiments discussed above, in the single-process and multithread program execution environments, the plurality of application programs can be made to run in safety.

Note that the present invention may be applied to a system configured by a plurality of devices (e.g., a computer main body, an interface device, a display, etc.) and to an apparatus constructed of a single device within a range in which the functions in the embodiments described above can be actualized.

Further, the range of the invention of the present application also includes an architecture embodied in such a way that the computer in the apparatus or the system connected to a variety of devices is, for the purpose of operating the variety of devices so as to actualize the functions in the embodiments discussed above, supplied with program codes of the software for actualizing the functions in the embodiments discussed above, and the variety of devices are operated by the computer (or a CPU and an MPU) of the system or the apparatus in accordance with the supplied program codes. Further, in this case, the program codes themselves, which are read from a storage medium, actualize the functions in the embodiments explained above, wherein the present invention is configured by the program codes themselves and a means, e.g., a storage medium stored with these program codes, for supplying the computer with the program codes.

The storage medium for supplying the program codes may involve the use of, for example, a floppy disk, a hard disk, an optical disk, a magneto-optic disk, a CD-ROM, a CD-R, a magnetic tape, a nonvolatile memory card, a ROM and so on.

Moreover, the program codes described above are, as a matter of course, included in the range of the invention of the present application in a case where the functions in the embodiments discussed above are actualized in cooperation with an OS (Operating System) or other application software running on the computer on the basis of instructions of the program codes as well as a case where the functions in the embodiments discussed above are actualized by executing the program codes read by the computer.

Furthermore, there is, as a matter of course, included a case where the program codes read from the storage medium are written to a memory provided in an extension board installed into the computer or in an extension unit connected to the computer, and thereafter a CPU etc. provided in the extension board or in the extension unit executes a part or the whole of actual processes on the basis of the instructions of the program codes, whereby the functions in the embodiments discussed above are actualized by this processing.

In the case of applying the invention of the present application to the storage medium described above, the storage medium may be stored with the program codes corresponding to the flowcharts explained above.

Although the present invention has been described in its preferred from with a certain degree of particularity, many apparently widely different embodiments of the invention can be made without departing from the spirit and the scope thereof. It is to be understood that the invention is not limited to the specific embodiments thereof except as defined in the appended claims.

What is claimed is:

1. A multi-application execution system comprising:
   starting means for starting each application program on a thread belonging to a thread group allocated to this application program;
   thread storage means for storing a relationship between thread groups and a thread belongs to respective thread groups;
   thread group storage means for storing a relationship between each application program and a thread group allocated to the application program;
   searching means for searching, when a certain thread tries to access a different thread in an application program, thread groups to which these two threads belong, from said thread storage means;
   determination means for determining whether the first and second thread groups, obtained by said searching means, are identical;
   check means for checking by referring to said thead group storage means, whether each of the first and second thread groups has been allocated to any application program; and
   access control means for enabling the access if the first and second thread groups are identical or at least one of the first and second thread groups has not been allocated to an application program.

2. A multi-application execution system according to claim 1,
   wherein said access control means rejects the access, if the first and second thread groups are not identical and if both of the thread groups have been allocated to respective application programs.

3. A multi-application execution system according to claim 1, wherein said starting means generates the thread group allocated to the application in accordance with an application start instruction, then generates the thread belonging to this thread group, and starts the application on this thread.

4. A multi-application execution method comprising the steps of:

starting each application program on a thread belonging to a thread group allocated to this application program;

searching, when a first thread tries to access a second thread in an application program, first and second thread groups to which the first and second threads belong, respectively, from thread storage means for storing a relationship between thread groups and a thread belongs to respective thread groups;

determining whether the first and second thread groups, obtained in said searching step, are identical;

checking by referring to thread groups storage means for storing a relationship between an application program and a thread group allocated to the application program, whether each of the first and second thread groups has been allocated to any application program; and enabling the access if the first and second thread groups, are identical or at least one of the first and second thread groups has not been allocated to any application program.

5. A computer-readable storage medium storing a control program for controlling a computer to perform a plurality of application programs, said control program comprising codes for causing the computer to perform:

starting each application program on a thread belonging to a thread group allocated to this application program;

searching, when a first thread tries to access a second thread in an application program, first and second thread groups to which the first and second threads belong, respectively, from thread storage means for storing a relationship between thread groups and a thread belongs to respective thread groups;

determining whether the first and second thread groups, obtained in said searching step, are identical;

checking by referring to thread groups storage means for storing a relationship between an application program and a thread group allocated to the application program, whether each of the first and second thread groups has been allocated to any application program; and enabling the access if the first and second thread groups, are identical or at least one of the first and second thread groups has not been allocated to any application program.

* * * * *

UNITED STATES PATENT AND TRADEMARK OFFICE
CERTIFICATE OF CORRECTION

| | | |
|---|---|---|
| PATENT NO. | : 7,194,739 B2 | Page 1 of 1 |
| APPLICATION NO. | : 10/320129 | |
| DATED | : March 20, 2007 | |
| INVENTOR(S) | : Fujisawa | |

It is certified that error appears in the above-identified patent and that said Letters Patent is hereby corrected as shown below:

Column 8, line 19 (claim 5, line 21), the comma after "group" should be deleted.

Signed and Sealed this

Fifteenth Day of May, 2007

JON W. DUDAS
*Director of the United States Patent and Trademark Office*